United States Patent

[11] 3,627,928

[72] Inventors Donald F. Wolper
Stony Brook;
Bernard M. Rosenheck, Huntington, both of N.Y.

[21] Appl. No. 796,464
[22] Filed Feb. 4, 1969
[45] Patented Dec. 14, 1971
[73] Assignee Litton Systems, Inc.

[54] TELEGRAPH PRIVACY SYSTEM
8 Claims, 4 Drawing Figs.

[52] U.S. Cl. .......... 178/22
[51] Int. Cl. .......... H04l 9/04
[50] Field of Search .......... 178/22

[56] References Cited

UNITED STATES PATENTS 3,038,028 6/1962 Henze .......... 178/22

*Primary Examiner*—Rodney D. Bennett, Jr.
*Assistant Examiner*—Daniel C. Kaufman
*Attorneys*—Alan C. Rose and Alfred B. Levine

ABSTRACT: A telegraph privacy system employing standard teleprinter apparatus arranged for half-duplex operation. The data bits of the telegraph character signals from the keyboard of the teleprinter are combined with the output data of a digital data scrambler-descrambler unit to insure privacy in transmission of messages. The scrambler-descrambler unit is of the self-synchronizing type whereby transmission can be commenced from any telegraph station at any time without special code synchronization or manual operation of a send-receive switch or other control. The timing and control of the system's functions are effected by logic circuits and electronic gated switching devices.

TELEGRAPH PRIVACY SYSTEM

BACKGROUND OF THE INVENTION

The invention relates to printing telegraph systems having encoding-decoding means for encoding upon transmission and decoding upon reception the data bits of the character signals of a teletype message. The encoding-decoding employs digital logic circuits instead of the relatively complicated encoding tape or mechanical switches of the prior telegraph privacy systems.

SUMMARY OF THE INVENTION

Identical scrambler-descrambler units are employed between a teleprinter and its associated line, at each terminal of a teleprinter network. The scrambler-descrambler units operate "on line," in half-duplex operation, and switch automatically from the send to the receive mode, and back again to the send mode, as determined by the status of the teleprinter equipment. Descrambling code synchronization is derived from the received scrambled messages, when the scrambler-descrambler unit automatically switches from its send to its receive mode.

A regenerator circuit is used in connection with the scrambler-descrambler code generator unit to regenerate the wave shape and timing of the teletype signal. The scrambler generator sums by module-2 addition data bits of the teletype character signal with signals generated by processing the data bits in a digital shift register. The regenerator circuit also provides timing and control signals for the scrambler-descrambler code generator. In order to insure that the data is in a form compatible with standard Telex practice, the start and stop bits of the teleprinter character signals are not scrambled.

Since no send-receive switch is required for two-way communication, operation is simpler and faster than in previous systems, operator errors are eliminated, and no special operator training is required.

By way of example, the system as described comprises at each terminal, a standard send-receive teleprinter, a signal regenerator and a scramble-descramble code generator of the self-sychronizing type.

The regenerator accepts a distorted telegraph signal from either the line or local teleprinter, and retimes and reshapes it. The preferred form of scrambler-descrambler code generator comprises a multistage shift register and modulo-2 feedback adder circuits, providing a two-level output signal of encoded teletype character signal data bits.

In the transmit mode, the line data pulses of each telegraph character signal are modulo-2 added with the output of the scrambler-code generator, and the scrambled data bits are transmitted on the line, and also clocked into the shift register. In the receive mode, the received scrambled data bits are shifted directly into the shift register and also modulo-2 added to the output of the descrambler-code generator to unscramble the data.

DESCRIPTION OF A PREFERRED EMBODIMENT

Figure 1:
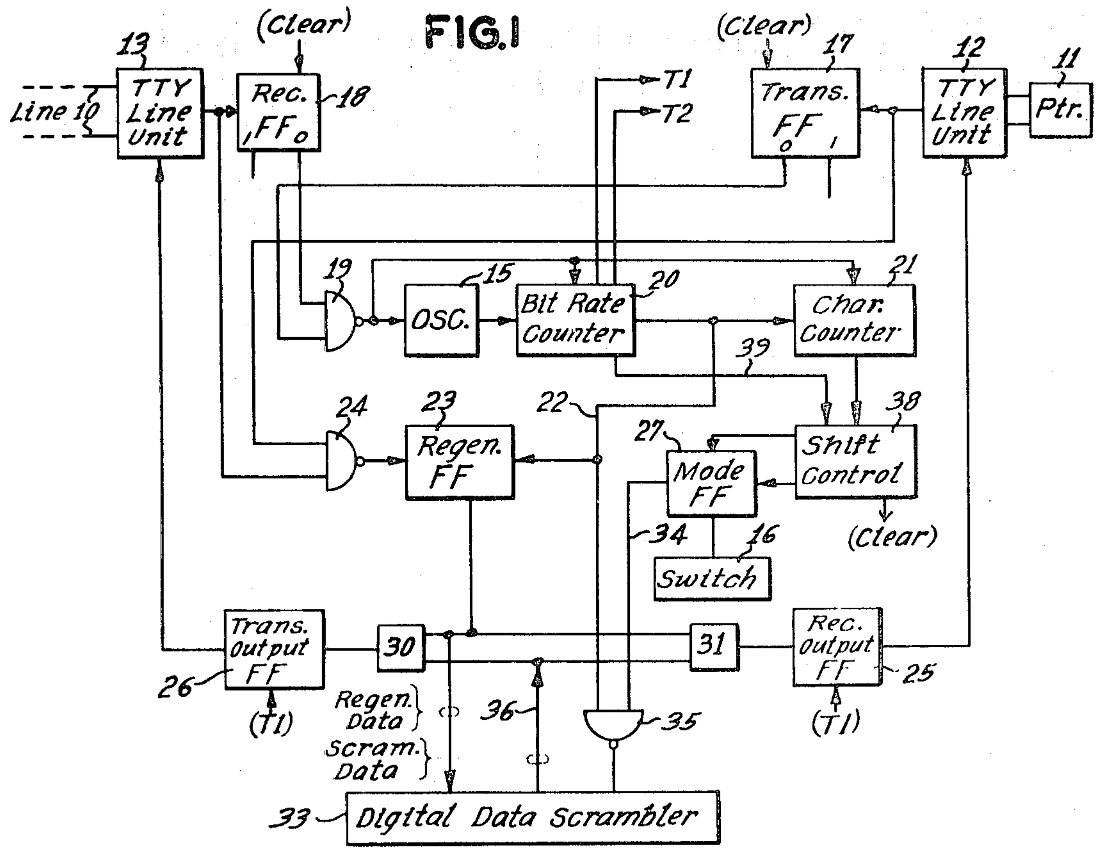
FIG. 1 is a functional diagram of a system embodying the invention employing standard teleprinter equipment.

Referring now to the drawings, FIG. 1 illustrates a telegraph privacy system including a teleprinter 11 and associated signal-regenerating and scrambling-descrimbling apparatus at a station used for communication with a remote station having similar equipment and connected to the line circuit 10. The standard keyboard printer 11 is adapted for half-duplex operation through the standard line control units 12 and 13 employing the usual relays for receiving and sending signals over the line circuit 10 by operation of the printer and keyboard respectively of the teleprinter 11. The signal-regenerating and scrambling-descrambling apparatus controlled by logic circuits employing conventional gates, flip-flops, etc. A gated oscillator 15 of a stable frequency related to the bit rate of the telegraph code signals serves as a timing control or clock for generating control signals. A switch 16 is provided for manually controlling the mode of operation of the system. When the switch 16 is set in the REGEN position, FIG. 3, the input telegraph character signals are sampled and regenerated as to timing and wave shape; in the SCRAMBLE position, the data bits of the telegraph character signals are also scrambled in addition to being regenerated.

Figure 4:
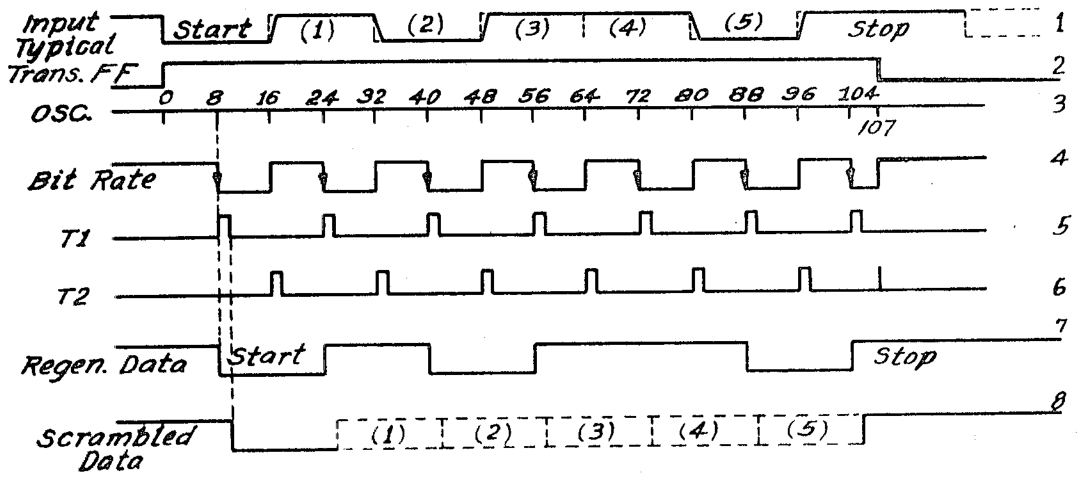
FIG. 4 is a timing diagram showing the relation between the time of occurrence of the input and regenerated telegraph character signals and various timing and control signals.

A message is transmitted by typing on the keyboard of the local teleprinter 11. Assuming a standard five-data-bit signal character signal for purposes of explanation, each character consists of a start pulse (space), 5 mark or space pulses, and a stop pulse (mark) as shown in FIG. 4. The first or start pulse places a low potential, or logic "O, " signal at the set input of a transmit flip-flop 17 for generating a low potential at the output terminal labeled TRANS. FF, FIG. 3. The receive flip-flop 18 remains in its cleared state with a high potential, or logic "I," signal at the output terminal labeled REC. FF. Due to the change of input levels from the 2 highs to a low and a high, the NAND gate 19 changes its output to a logic "1" level for gating on the oscillator 15 thus enabling the bit rate counter 20 and the character counter 21. The signal from transmit flip-flop 17, TRANS. FF, is also applied to gate 42 to disable the receive flip-flop 18.

The gated oscillator 15 is a basic relaxation oscillator circuit having an output frequency 16 times that of the baud rate of the teleprinter, for example. The oscillator output pulses are fed to the toggle input of the first stage of the bit rate counter 20, which is a standard ripple counter comprising four JK-type flip-flops serving to divide the oscillator frequency down by 16 to provide a clock signal on conductor 22 equal to the teleprinter bit rate. This signal is fed to the regenerator flip-flop 23 and also used to drive the first stage of the character counter 21. Timing signals T1 and T2 are developed by the combination of the different phases of the output signals of the flip-flops within the bit rate counter 20. T1 is used to clock the receive output flip-flop 25 and the transmit output flip-flop 26 as indicated in FIG. 1. T2 is used in connection with the counter 21 as will be explained in the description of the detailed circuit diagram of FIGS. 2 and 3. The character counter 21 comprises three JK-type flip-flops combined with two gates to form a conventional binary counter advanced once for each baud or character signal bit.

The telegraph character signal from the teleprinter 11 is applied through gate 24 (FIG. 1) and sampled by flip-flop 23; every time the bit rate clock signal goes from the "1" state to the "0" state, which occurs at the counts of 8, 24, 40 —104 (see FIG. 4) at the midbaud position of the start pulse and the character code pulses. The character counter 21 is also advanced at these counts.

With the switch 16 in the REGEN position, the mode control flip-flop 27 permits signal regeneration by the bit rate counter 20 and regenerating flip-flop 23 without scrambling the signal during the transmit mode of operation, the regenerated signal is impressed upon the line 10 through the gate 30, TRANS. output flip-flop 26 and line unit 13, while the REC. output flip-flop 25 is inhibited by the signal from flip-flop 17, Trans. FF, so as to prevent the output signals from passing into the circuit of the local teleprinter 11. When the switch 16 is actuated to the SCRAMBLE position, the scrambler unit 33 is enabled through the conductor 34 and gate 35 to produce a scrambled output signal on conductor 36 connected through the gate 30 to the output flip-flop 26 it should be noted that the start and stop pulses are not scrambled. The scrambler unit 33 may be a pseudorandom code generator similar to that described in "The Bell System Technical Journal, " Vol. XLVI (1967 ) pp. 452–454, entitled "Self-Synchronizing Digital Data scrambler.".

In order to avoid scrambling the start and stop pulses of the telegraph character signals, gating means 38 for shift control is provided. Means 38 includes NAND-gates data and to generate a logic "0" if a start pulse is not present on the count of 8 from the counter 21. The low-level logic signal thus generated is passed through gates 87 and 88 to generate a clear signal. Gate 89 is connected to be operated through conductor 39 at the count of 24 in the scrambled mode. This sets the flip-flop 27 to allow the shift register of the scrambler unit 33 to be clocked though conductor 22, and the data pulses of the character signal are scrambled. At the count of104, during the stop pulse, the output of gate 83 in shift control 38 goes low to reset the flip-flop 27. At the count of 107 the output of gate 53 goes low to generate a clear signal which resets the system to standby in readiness to transmit or receive the next telegraph character signal.

When receiving a message on the teleprinter 11, the operation is the same as described above except that the control functions are controlled by REC. flip-flop 18 and the TRANS. flip-flop 17 is inhibited; and with switch 16 in the SCRAMBLED position, the scrambled data received from the remote station are shifted into the scrambler 33 for decoding. Since the scramblers at both station remain in synchronism, either printer may send or receive messages without the operation of send-receive switches or any other controls.

Figure 2:
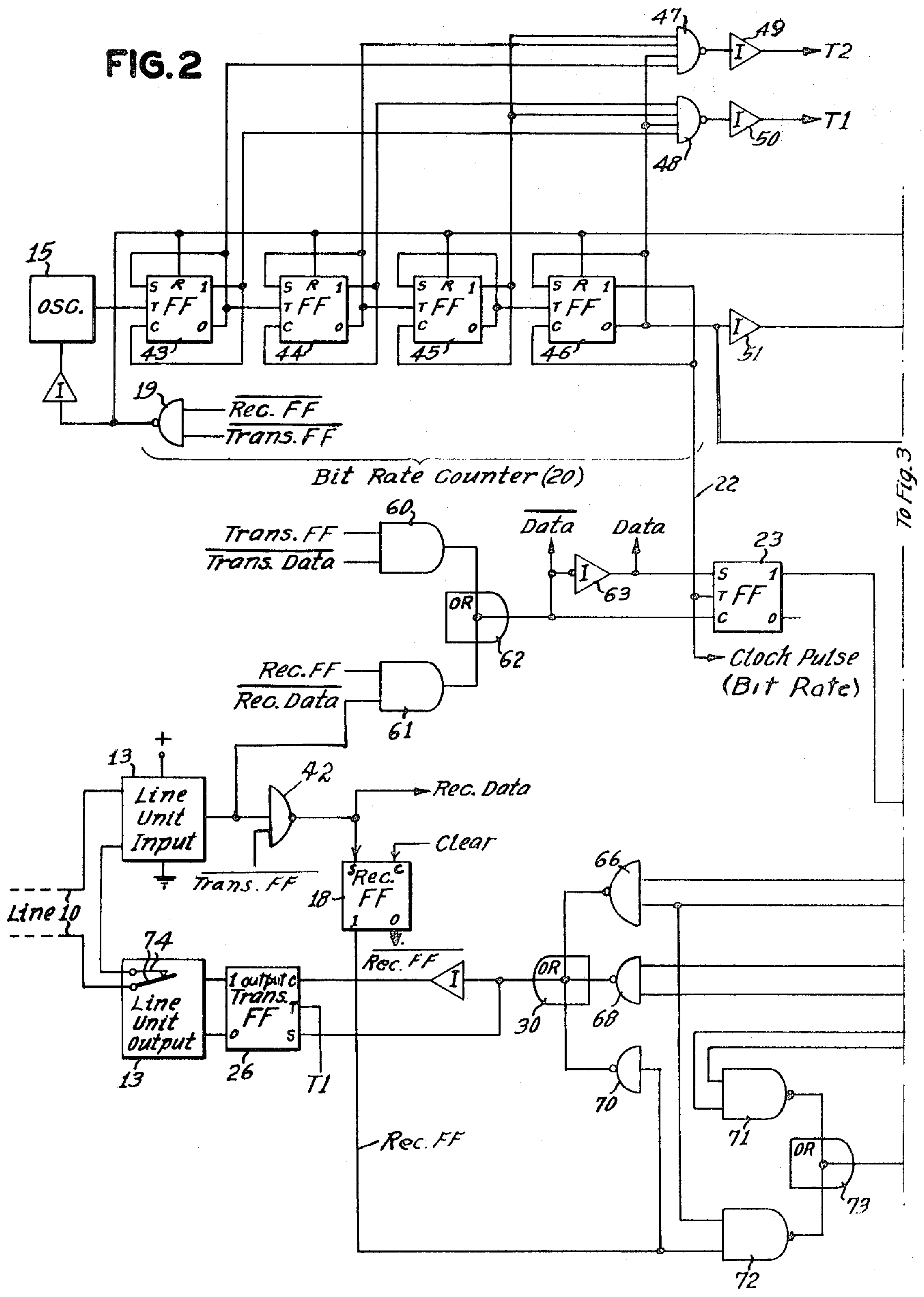
FIGS. 2&3 constitute a detailed schematic circuit diagram of the system shown in FIG. 1.
Figure 3:
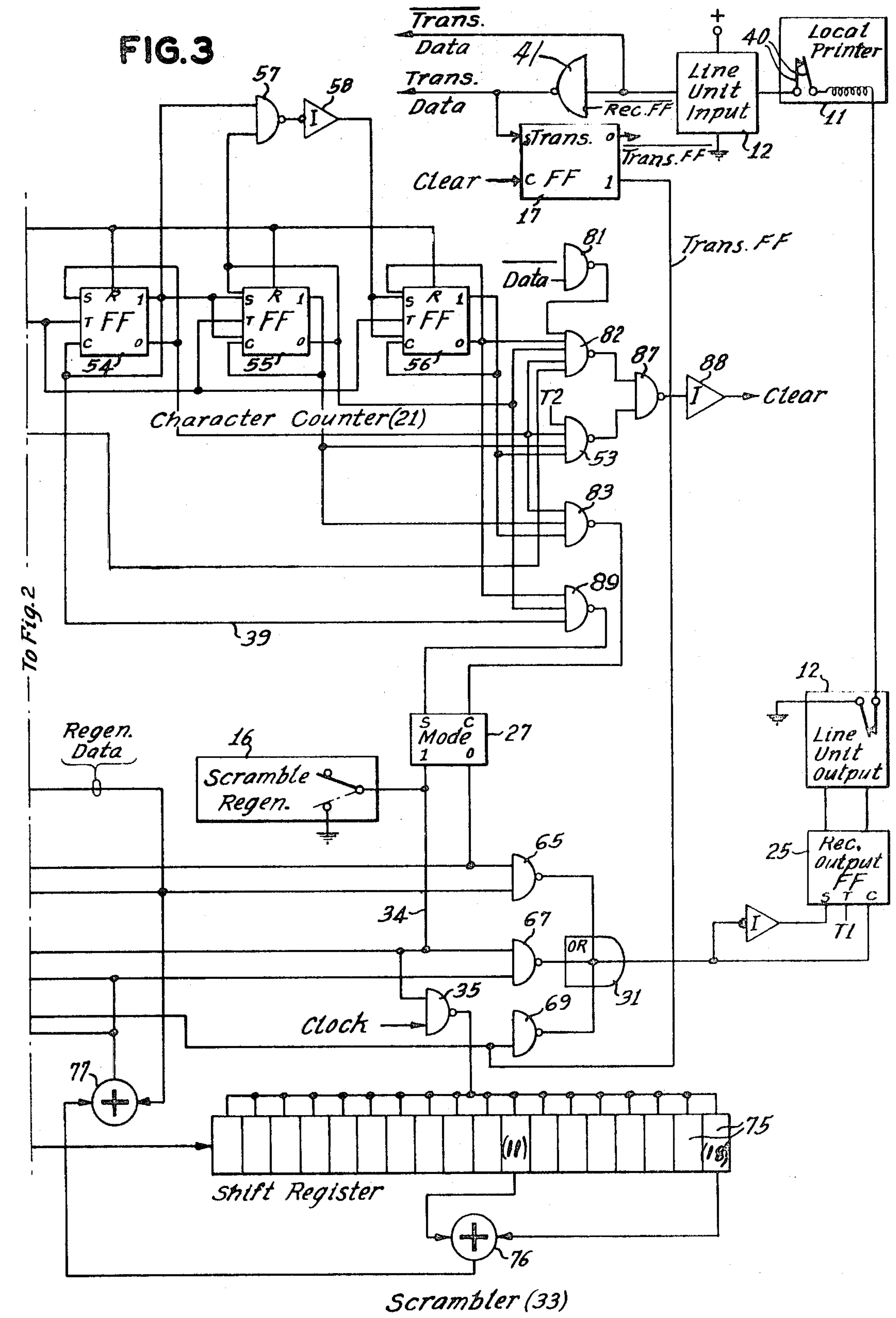

FIGS. 2 and 3, discussed in some detail hereinabove, illustrate in greater detail the embodiment of FIG. 1. These figures show a typical arrangement of the elements of the bit rate counter 20 and character counter 21 together with the associated gates and inverters in the control circuits for the line units 12 and 13, and the scrambler unit 33. In the description, it is assumed that the logic levels in the system are logic 1, high or +5 volts DC and logic 0, low or ground potential. Furthermore the logic elements are assembled to be arranged in the customary fashion so that when power is turned on, the transmit and receive flip-flops 17 and 18 are cleared, the enabling circuit for the oscillator 15 is disabled, and the elements of the bit rate counter 20 and character counter 21 are set to all ones. This corresponds to the standby mode with the receive and transmit flip-flops cleared in readiness to effect transmission or reception of a message. Various circuit designs can be employed for performing the logical functions described herein. The selection of circuits where positive potential equals logic "1" and ground equals logic "0" is arbitrary. The elements could be constructed using other values.

A message is transmitted to the teleprinter at the remote station on line 10 by typing on the keyboard of the local printer 11. The opening and closing of relay contacts 40 generate the marking or spacing signals of the character code. The first bit transmitted by the printer is a start pulse applied across the input of the line unit 12. The output of the printer is normally marking which holds the output of the line unit ground. The first space bit is inverted by the gate 41 and sets the transmitting flip-flop 17 to generate a logic "0" at Trans. FF. The receive flip-flop 18 still applies a logic "1" to gate 19 at REC. FF to gate on the oscillator 15 and enable the bit rate counter 20 and the character counter 21.

Assuming the frequency of the oscillator 15 for example to be 16 times the baud rate of the teleprinter, the four JK-type flip-flop stages of the bit rate counter 20 divide the output of the gated oscillator 15 down by 16, resulting in a clock signal in the conductor 22 equal to the baud rate (see FIG. 4). The flip-flops 43, 44, 45 and 46 of the counter 20 are interconnected to form a conventional ripple counter and the flip-flops are connected through the NAND gates 47 and 48 and associated inverters 49 and 50 to supply timing pluses T1 and T2 having a predetermined time relation to the bit rate pulses in the conductor 22. (See FIG. 4). Because of the interconnection of the oscillator 15 and flip-flops 43 to 46 as shown, the clock or timing pulses on conductor 22 switch from a positive to a ground potential at the midbaud point of the input data from the teleprinter 11. The timing pulses are fed to the regenerator flip-flop 23 and the inverse of the timing signals fed through a power inverter 51 to drive the character counter 21.

The timing pulse T1 is used to clock the receiving output flip-flop 25 and the transmitting output flip-flop 26. The timing signal T2 is fed to the gate 53.

The character counter 21 may be a standard synchronous binary counter as shown and is advanced once for every baud. It comprises 3 JK-type flip-flops 54, 55 and 56 combined with gates 57 and 58. In FIG. 4, line 3 represents the successive cycles of the oscillator 15, the first pulse occurring at the beginning of the start pulse of each transmitted character and pulses 8, 24, 40, 56, 72, 88 and 104 at the midpoint of each baud as shown in this figure. At each of these counts, the character counter 20 is advanced once. The timing pulses T1 occur at these points 8, 24—to sample the telegraph character bit signals at the midbaud of each signal bit. The regenerated signals are shown in line 7 of FIG. 4. When the bit rate clock signal goes high, the data signal is sampled to generate a regenerated data signal that is delayed from the input signal by ½ baud. The operation is as follows:

Since the transmitting flip-flop 17 is in the "1" that is, there is a logic "1" on the Trans. FF output, the gate 60 is enabled and allows the signal labeled TRANS DATA from line input unit 12 to be passed by gate 60. Gate 61 is inactive because of the ground signal or logic "0" applied from the outputs REC. FF, of the receiving flip-flop 18. The output of gates 60 and 61 are applied to the OR-gate 62 and the output of gate 60 is inverted by the inverter 63 to generate a DATA signal which is applied to the set signal input terminal of the regenerating flip-flop 23. The gates 60, 61, 62 and 63 comprise the gate 24 shown in FIG. 1. The DATA signal is applied to the clear input of flip-flop 23. Therefore, the telegraph character code signals will be sampled during the time the bit rate clock signal is in the logic "1" state. Character counter 21 is also advanced at these counts to determine the end of each telegraph character signal sequence.

Provision is made in the system shown for transmitting characters either scrambled or unscrambled as desired. With the switch 16 in the REGEN position, the shift and mode control flip-flop 27 is held in the "0" state. This forces the "1" output low and the "0" output high, the latter enabling gates 65 and 66. The output terminals of gates 65, 67 and 69 are connected to the OR gate 31. The logic "1" signal Trans. FF from the transmitting flip-flop 17 is applied to the input of gate 69 and when high, connected as an inverter, maintains the flip-flop 25 in the set position to block data from transmission into the teleprinter terminal. Similarly, the 66, 68 and 70 are connected to the OR-gate 30 and are enabled by the receiving flip-flop 18 whose output REC. FF is at a "0" logic level.

The regenerated data signal with switch 16 in the REGEN position is inverted by gate 66 and applied to the clear input of transmitting flip-flop 26 which is clocked by timing signal T1. The output signals of flip-flop 26 drive the inputs of the transmit section of the line unit 13, causing the contacts 74 in the line circuit to be opened or closed, thus generating marking and spacing signals in the line circuit 10. When the timing signal T1 goes negative, the signals applied to the set and clear inputs of the flip-flops are sampled to transmit the regenerated signal data.

When it is desired to obtain privacy in transmission by scrambling the printer output character signals, the switch 16 is actuated to the SCRAMBLE position. At the oscillator pulse count of 24, the output of the NAND gate 89 goes low or to ground to set the mode control flip-flop. Gates 65 and 66 are gated off disabled and gates 67, 68 and 35 are enabled. Enabling gate 35 couples the clock timing pulses from the bit rate output of the counter 20 to the shift register 75 of the scrambler 33.

The scrambler effects a reversal of certain of the mark and space signals in a random manner and is preferably a digital code generator of the self-synchronizing type. As more fully described in the generator 33 comprises a multistage shift register such as the shift register 75 having 18 stages as indicated diagrammatically in FIG. 3. The data signals are impressed upon the scrambler through the OR gates 71, 72 and 73. The shift register may be made up of a series of bistable devices each coupled to the next by an interstage gate and operating in such a way that the binary state of any given stage is the same as the binary state of the stage preceding it during the previous time interval. The register is stepped each time an advance pulse is applied to the interstage gates. For example the 11th and 18th stages of the shift register may be combined by a modulo-2 adder 76, the output of adder 76 being then modulo-2 added to the regenerated signal in the modulo-2 adder 77. However, the start and stop pulses of the transmission code are not scrambled to insure that the message data is in a form compatible with standard telegraph practice. This is accomplished by setting the mode control flip-flop 27 at the count of 24 and resetting it at the count of 104 by signals from gates 89 and 83, respectively, The MODE flip-flop 27 allows the data to be scrambled when set and at the same time allows gate 35 to transmit clocked pulses to the shift register of the pseudoscrambler-descrambler unit 33. In the scramble mode, the five scrambled data bits of each telegraph character sequence are clocked into the shift register, stored by the TRANS output flip-flop 26 and transmitted by the output unit 13 when the timing pulse T1 goes low. At the count of 107 (FIG. 4), after each character of the message is transmitted the gates 87 and 88 provide a clear signal to the flip-flops 17 and 18 thereby resetting to standby in readiness to transmit or receive.

Operation in the receive mode (transmission from the remote station to teleprinter 11) is identical to the transmit mode except that the control functions are now controlled by the REC flip-flop 18, the TRANS flip-flop 26 is inhibited, and the scrambled data bits are shifted into the shift register 75 of the scrambler. Since the scramblers at the local and remote stations are synchronized, either printer may send or receive messages without operating any controls such as the usual send-receive switches.

The invention thus provides an improved system for regenerating and scrambling teleprinter signals to obtain privacy in the transmission of messages in the operation of standard teleprinter equipment. It will be obvious that certain features of the invention may be utilized in data transmitting systems different from that specifically shown and described above for the purpose of explaining the underlying principles thereof. Furthermore while the half-duplex telegraph system with two terminals, which is widely used in practice, has been emphasized in the foregoing description, the invention may be utilized without modification (except for omission of unnecessary control circuits in some cases) for simplex circuits and communication networks having more than two terminations. This important capability as well as the other features of the invention are realized without sacrificing simplicity and reliability.

What is claimed is:

1. In a telegraph system, a transmission network having a plurality of network terminations, teleprinters at each of the network terminations for generating telegraph character signals for transmitting messages over said network and for printing telegraph character signals for receiving messages over said network, said network terminations including, transmitting and receiving gate means to select the transmit or receive mode of each of said teleprinters, and means to set one of said gate means and inhibit another in response to the start of the generation of each of said telegraph character signals by a local or remote teleprinter, and means located at each of said network terminations including a self-synchronizing scramble-descramble unit for encoding said telegraph character signals generated by a teleprinter to provide a scrambled date stream for transmission over said network, and for decoding said scrambled date stream received by the same teleprinter over said network.

2. A telegraph system according to claim 1, in which said scramble-descramble units are pseudorandom code generators connected to said network terminations for generating digital data which is combined in modulo-2 adders with said telegraph character signals.

3. In a telegraph system having start-stop sending and receiving teleprinters, means for regenerating the character code signals sent and received by said teleprinters, and means for scrambling and unscrambling the character code signals at the sending a receiving teleprinters respectively, said signal-regenerating means including a binary counter for detecting the end of each character code representing each individual message character, a relaxation oscillator having an output frequency which is a multiple of the teleprinter baud rate, a second counter for dividing the oscillator frequency down to obtain a clock signal equal to the baud rate for timing the regenerating means, and circuit connections from said binary counter and said second counter to enable said scrambling-unscrambling means and transmission of character code signals from a sending teleprinter to a receiving teleprinter.

4. A telegraph system according to claim 3, in which means including said binary counter and said second counter is provided for resetting the regenerating and scrambling-unscrambling means to the standby mode after each character code representing a message character is transmitted.

5. A telegraph system according to claim 3, in which a transmit flip-flop and a receive flip-flop for each teleprinter are arranged to condition said telegraph system for transmitting or receiving messages in response to transmission or reception of a start pulse preceding the character code message signals and said signal-regenerating means resets said transmit and receive flip-flops to the standby mode at the end of each character code representing a single message character.

6. In a telegraph system having teleprinter stations connected through a line circuit or transmission channel, a teleprinter at each of said stations for generating character code signals for transmitting messages, a teleprinter circuit associated with each teleprinter, said circuit including a transmit flip-flop and a receive flip-flop to condition the associated teleprinter for transmitting or receiving respectively, and signal regenerating means for the transmitted or received character code signals, and means including said signal-regenerating means for resetting said transmit and receive flip-flops and the regenerating means to the standby mode at the end of each transmitted or received character code representing a single message character.

7. In a telegraph system having teleprinter stations connected through a line circuit or transmission channel, a teleprinter circuit at each of said stations for generating start-stop character code signals for transmitting messages, each teleprinter circuit being normally in the standby mode, each teleprinter circuit including signal-regenerating means including an oscillator and a regenerator flip-flop clocked by said oscillator to time the regenerated signals, means responsive to the first start pulse either from the local teleprinter or received over the line circuit for enabling the oscillator of the signal-regenerating means, a pseudorandom code generator, means for combining the output signals of said code generator with the character code signals generated by the transmitting teleprinter to scramble the message signals, means for enabling the code generator after said signal-regenerating means is rendered operative by said start pulse, and means for returning the signal-regenerating means and scrambling means to the standby mode after each character code of a message character.

8. In a telegraph system, a transmission network having a plurality of teleprinter terminations, a teleprinter at each of the network terminations for generating character code signals for transmitting messages over said network, and for printing character code signals received over said network, a teleprinter code scrambler at each of said terminations normally in the standby mode, each teleprinter code scrambler including signal-regenenerated signals, means responsive to the first start pulse either from the local teleprinter or received over the line circuit for enabling the oscillator of the signal-regenerating means, means for combining the output signals of said code scrambler with the character code signals of a message character scramble or unscramble the message signals, and means for enabling the code scrambler after said signal-regenerating means is rendered operative by said start pulse.

* * * * *